(12) United States Patent
Dobbek et al.

(10) Patent No.: US 6,388,832 B1
(45) Date of Patent: May 14, 2002

(54) METHOD AND SYSTEM FOR PROVIDING SPINDLE MOTOR CONTROL FOR HEAD LOADING IN A DISK DRIVE

(75) Inventors: Jeffrey Joseph Dobbek, San Jose; Bryan Scott Rowan, Los Gatos; Louis Joseph Serrano; Mantle Man-Hon Yu, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,556

(22) Filed: Apr. 27, 1999

(51) Int. Cl.$^7$ .......................... G11B 15/46; G11B 21/02
(52) U.S. Cl. ........................ 360/73.03; 360/75
(58) Field of Search ................ 360/73.03, 75; 318/430, 599

(56) References Cited

U.S. PATENT DOCUMENTS

| | | |
|---|---|---|
| 5,309,099 A | 5/1994 | Irarrazabal et al. ......... 324/306 |
| 5,473,230 A | 12/1995 | Dunn et al. .................. 310/432 |
| 5,589,996 A | 12/1996 | Patrick et al. .............. 360/73.3 |
| 5,592,345 A * | 1/1997 | Carobolante et al. .... 360/73.03 |
| 5,666,236 A * | 9/1997 | Bracken et al. ................ 360/75 |
| 5,959,806 A * | 9/1999 | Leung .......................... 360/104 |
| 6,236,527 B1 * | 5/2000 | Uchiike et al. ................ 360/75 |

FOREIGN PATENT DOCUMENTS

| | | |
|---|---|---|
| JP | 59127269 | 7/1984 |
| JP | 4358352 | 12/1992 |

* cited by examiner

*Primary Examiner*—David Hudspeth
*Assistant Examiner*—K. Wong
(74) *Attorney, Agent, or Firm*—Sawyer Law Group LLP; Randall J. Bluestone

(57) ABSTRACT

Method and system aspects for controlling spindle motor speed during head loading in a disk drive are described. The aspects include inputting a time-varying reference velocity profile signal, and selecting a controller to control spindle motor speed. Further included is feeding forward control signals sufficient to precompensate for drag during a head loading event and maintain spindle motor speed within an operating tolerance.

17 Claims, 2 Drawing Sheets

METHOD AND SYSTEM FOR PROVIDING SPINDLE MOTOR CONTROL FOR HEAD LOADING IN A DISK DRIVE

RELATED APPLICATIONS

The present application is related to U.S. Pat. No. 6,262,619 METHOD AND SYSTEM FOR POWER AMPLIFIER OFFSET NULLING, and assigned to the assignee of the present invention.

FIELD OF THE INVENTION

The present invention relates to spindle motors of disk drives, and more particularly to a spindle motor controller for head loading in disk drives.

BACKGROUND OF THE INVENTION

Digital data storage conventionally utilizes disk drives with rotating rigid disks. Technology improvements have tried to increase the storage capacity and accuracy of disk drives while reducing the weight and power consumption. With the improvements, even greater emphasis has been placed on accurately controlling the speed of the spinning disks. Normally, an attempt is made to maintain the spindle motor speed of the drive at a constant velocity through application of a steady-state current to the spindle motor with some associated feedback correction in the form of a standard control or servo loop.

FIG. 1 illustrates a classical spindle speed control loop. As shown, a proportional integral digital controller 10, usually in the form of firmware, sends a control output signal to a digital-to-analog converter (D/A) 12. The D/A 12 translates the control signal into analog form for input into a motor predriver 14 that utilizes the signal to adjust the speed of the spindle motor 16. The speed of the spindle motor 16 is sent from the motor predriver 14 as tachometer pulses that are counted by a digital counter 18 to determine a frequency of the pulses that provides a measurement of the period between the pulses to estimate the speed of the spindle motor 16. This measured speed signal is then subtracted from an input reference signal that has a constant period to provide a speed error signal. The speed error signal is utilized as feedback in the digital controller 10 to adjust the spindle motor speed proportional to the desired constant speed for the spindle motor 16.

A recognized problem in modern disk drives is the force of drag that results from the interaction between the head of the drive and the air that circulates around the disks as the disks rotate at high velocity. Some systems, such as those described in U.S. Pat. Nos. 5,473,230 and 5,592,345, attempt to overcome the force of drag during head positioning. These systems, however, base their compensation according to a location or zone of the disk over which the head is positioned. While seemingly compensating for drag during head positioning, a problem still exists at the instant the head is loaded, since the drag torque on the spindle motor increases, which decelerates the motor. In a high velocity drive with multiple platters and multiple heads, this deceleration can be large enough to cause the motor to slow to a speed that is outside of its normal operating tolerance. Further, the response by the speed controller to the unexpected load change also results in a delay in returning the spindle speed to an acceptable value. The delay causes an increase in the time required for the loading process to complete while the motor speed recovers and can slow initial access to data during system start-up or error recovery.

Accordingly, what is needed is a system and method for controlling the spindle motor speed to within a specified tolerance during the head loading process. The present invention addresses such a need.

SUMMARY OF THE INVENTION

Method and system aspects for controlling spindle motor speed during head loading in a disk drive are described. The aspects include inputting a time-varying reference velocity profile signal, and selecting a controller to control spindle motor speed. Further included is feeding forward control signals sufficient to precompensate for drag during a head loading event and maintain spindle motor speed within an operating tolerance.

Through the present invention, precompensation for drag effects during a head load from a ramp position in a disk drive reduces potential for delay through a servo control loop when achieving appropriate spindle speed. These and other advantages of the present invention will be more fully understood in conjunction with the following detailed description and accompanying drawings.

DETAILED DESCRIPTION

The present invention relates to spindle motor control during a head loading event. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
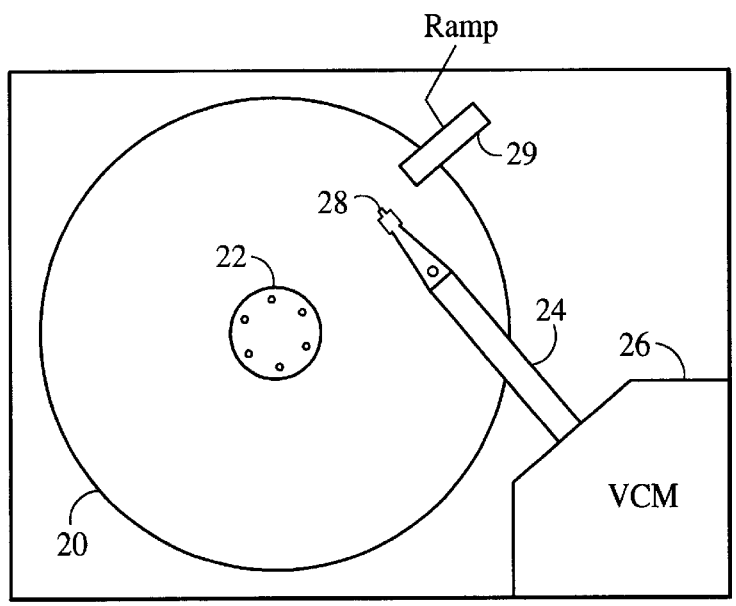
FIG. 2 illustrates a top view of disk drive components including a ramp that are involved in a head loading process.

The present invention provides a system and method to control the spindle motor speed to within a specified tolerance or velocity profile during the head loading process. Referring now to FIG. 2, a basic diagram of a top view of the mechanical components in the drive involved in the head loading process is illustrated. Included in the components are a stack of disks 20 mounted to a spindle 22 driven by a spindle motor (not shown). A ramp type load/unload mechanism is employed to lift the heads from each disk surface as the actuator 24 (i.e., the arm that holds the read/write head) travels beyond the disks' outer diameter by way of the voice coil motor (VCM) 26 to park the heads outside of the disk stack 22. At the end of each head/suspension assembly is a lift tab 28 which engages a ramp 29, i.e., an inclined cam surface positioned at the disk outer diameter. During a head loading event, the head is moved from the ramp 29 to the disk 20.

At the instant the head is loaded, the drag torque on the spindle motor increases. The invention provides a means to couple the spindle motor control to the head loading process such that more precise control of the motor is maintained. This reduces the time required for the motor to achieve or maintain its operating tolerance during the head loading process and reduces the overall time required for the head loading process to complete.

Figure 1:
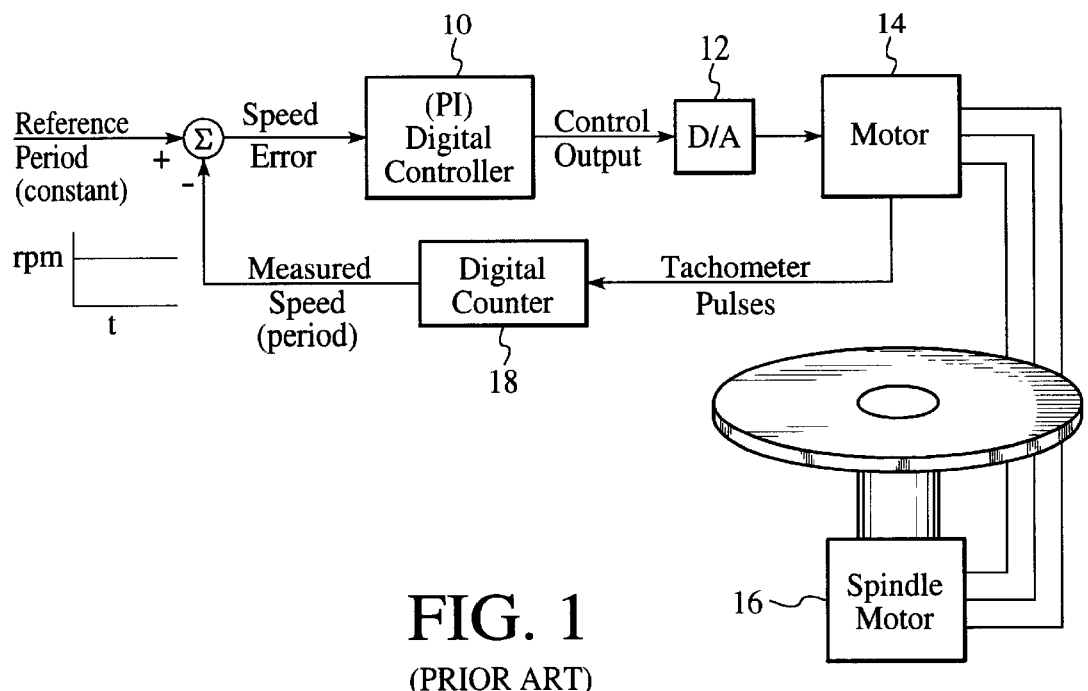
FIG. 1 illustrates a diagram of a classical spindle speed control loop for controlling spindle motor speed.
Figure 3:
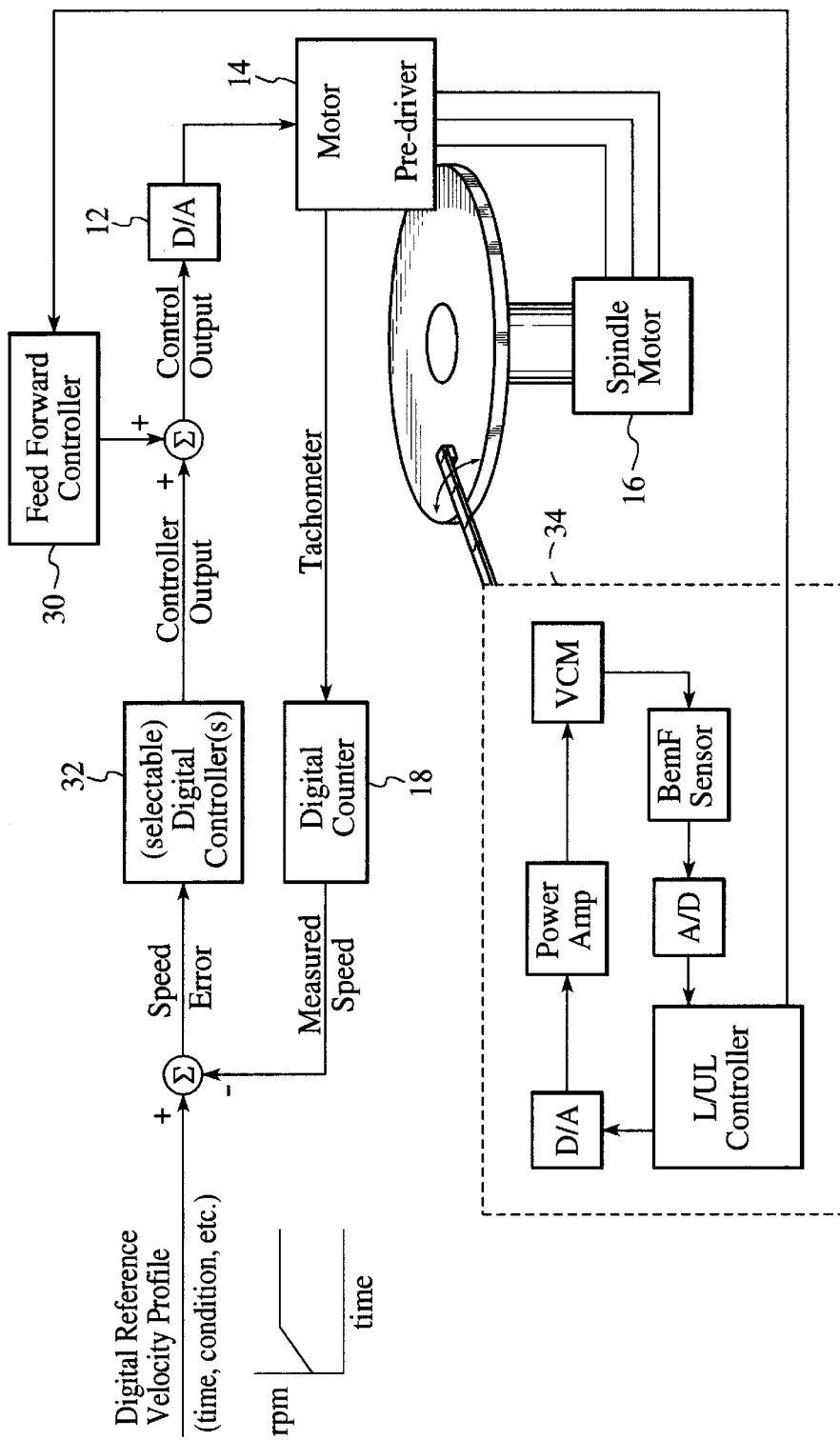
FIG. 3 illustrates a diagram of a spindle motor control loop in accordance with the present invention for controlling a spindle motor during a head loading event.

In accordance with the present invention, a feedforward controller is provided for applying a feed forward control signal to the spindle motor during the head loading event. FIG. 3 illustrates a spindle speed control loop in accordance with the present invention that improves the prior art loop shown in FIG. 1. As shown, the control loop includes a feedforward controller 30. Preferably, the feedforward controller 30 is provided in the form of firmware, as is well understood by those skilled in the art. Since the drag change during the head loading operation can be determined, the expected drag change can be used to apply the appropriate control to the spindle motor 16 to precompensate for the drag change. Of course, the expected drag change is tuned for the specific change that occurs for a particular servo-mechanical system. The feedforward controller 30 preferably provides a feed forward control signal that precompensates for the expected drag change and that is combined with the controller output signal from controller 32 to produce the control output signal for conversion by the D/A 12 for motor predriver 14. The application of the feed forward control signal occurs upon recognition of a head loading event occurring, which is signalled in the system from a load/unload control unit 34 to the feedforward controller 30.

In addition to the feedforward controller 30, the present invention utilizes a digital reference velocity profile signal for use in determining a speed error in the spindle speed control loop. With the use of the reference velocity profile, the loading event is viewed not just as a step change in drag but as a more realistic change in the desired velocity. The velocity profile therefore provides an input reference voltage signal that alters the target velocity over time or during an event, e.g., during a head load, in order to account for the effects of head load, feedforward, and desired terminal velocity. In contrast, the prior art technique just servos to the desired velocity based on the constant reference signal input without accounting for the effect of loading and feedforward. A look-up table is a suitable method of providing the information for use as the reference velocity profile, where the times at which the table is accessed to alter the reference profile are determined in response to event recognition through knowledge of the machine state, i.e., in a main processor of the drive, as is well understood by those skilled in the art.

Further, while the controller 32 is shown as a single element in FIG. 3, separate controller logic may be used in accordance with the present invention to provide one controller for head loading and one controller for normal reading and writing activity, i.e., the standard proportional integral controller. By using two controllers, the motor performance can be optimized for each case individually through selection of the appropriate controller in response to a head loading event occurring as indicated by the machine state. Since the speed regulation requirements for normal reading and writing often differ from head loading, the use of more than one controller offers an advantage over a system using a single motor control loop that merely accounts for reading and writing without accounting for head loading, as is achieved through the feed forward signal in the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A computer readable medium combining program instructions for controlling spindle motor speed during head loading in a disk drive comprising:
   inputting a time-varying reference velocity profile signal;
   selecting a controller to control spindle motor speed; and
   feeding forward control signals sufficient to precompensate for drag during a head loading event and maintain spindle motor speed within an operating tolerance.

2. The program instructions of claim 1 wherein selecting a controller further comprises selecting a first controller for use during the head loading event and selecting a second controller for use during normal reading and writing activity.

3. The program instructions of claim 1 wherein inputting a time-varying reference velocity profile provides a velocity reference signal that accounts for head loading, feeding forward, and a desired terminal velocity of the spindle motor.

4. The program instructions of claim 3 further comprising providing a look-up table as the time-varying reference velocity profile.

5. The program instructions of claim 1 further comprising identifying initiation of a head loading event by a load/unload control unit.

6. The program instructions of claim 1 wherein feeding forward is performed through firmware.

7. A system for adjusting spindle motor speed during head loading in a disk drive, the system comprising:
   a spindle motor predriver for driving a spindle motor;
   a load/unload control unit for controlling loading/unloading of a head; and
   a feedforward controller for receiving a signal indicative of a load event by the load/unload control unit and for providing a feed forward signal to the spindle motor predriver that precompensates for drag in the spindle motor during the load event.

8. The system of claim 7 further comprising a ramp coupled to the load/unload control unit and from which the head is loaded/unloaded.

9. The system of claim 7 further comprising at least one controller for adjusting the spindle motor speed in response to a determined error signal and the feed forward signal.

10. The system of claim 9 wherein the at least one controller further adjusts based on an input reference velocity signal.

11. The system of claim 10 wherein the input reference velocity signal varies over time.

12. The system of claim 7 wherein the feedforward controller comprises firmware in the disk drive.

13. A system for providing spindle motor control during a head loading event, the system comprising:
   a ramp;
   a head loaded to/from the ramp;
   at least one disk read/written by the head;
   a spindle motor for spinning the disk;
   at least one controller for controlling the spindle motor speed, the at least one controller adjusting spindle motor speed based on a time-varying digital reference velocity profile signal and a feed forward control signal during a head loading event; and
   a feedforward controller for providing the feed forward control signal during the head loading event to precompensate for an expected drag change during the head loading event, wherein an operating tolerance for the spindle motor is maintained and an overall time required to complete the head loading event is reduced.

14. The system of claim 13 further comprising a load/unload control unit for signalling an occurrence of the head loading event to the feedforward controller.

15. The system of claim 13 wherein the feedforward controller and at least one controller are provided as firmware in the system.

16. The system of claim 13 wherein the at least one controller comprises a standard proportional integral controller.

17. The system of claim 13 further comprising a look-up table for the time-varying digital reference velocity profile signal.

* * * * *